(12) United States Patent
Strengert et al.

(10) Patent No.: US 8,185,288 B2
(45) Date of Patent: May 22, 2012

(54) BRAKE SYSTEM FOR A VEHICLE AND A METHOD FOR OPERATING A BRAKE SYSTEM FOR A VEHICLE

(75) Inventors: Stefan Strengert, Stuttgart (DE); Peter Blessing, Heilbronn (DE); Dirk Hofmann, Krnov-Pod Cvilinem (CZ); Werner Harter, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 12/668,007

(22) PCT Filed: Jul. 1, 2008

(86) PCT No.: PCT/EP2008/058441
§ 371 (c)(1),
(2), (4) Date: Jan. 6, 2010

(87) PCT Pub. No.: WO2009/015972
PCT Pub. Date: Feb. 5, 2009

(65) Prior Publication Data
US 2010/0198473 A1 Aug. 5, 2010

(30) Foreign Application Priority Data
Aug. 2, 2007 (DE) .................. 10 2007 036 259

(51) Int. Cl.
*G06F 19/00* (2011.01)
(52) U.S. Cl. .............. 701/70; 701/71; 701/48; 701/33.8; 303/146; 303/113.2; 303/166; 303/167; 188/162

(58) Field of Classification Search .................... 701/48, 701/33.8, 70, 41, 31.4, 71, 76; 303/11, 146, 303/113.2, 152, 167, 166; 188/162
See application file for complete search history.

(56) References Cited

U.S. PATENT DOCUMENTS

| 5,752,748 | A | 5/1998 | Schramm et al. |
| 5,952,799 | A | 9/1999 | Maisch et al. |
| 6,238,019 | B1 * | 5/2001 | Okazaki et al. ............... 303/146 |
| 6,299,261 | B1 | 10/2001 | Weiberle et al. |
| 2009/0200124 | A1 * | 8/2009 | Heise ........................... 188/162 |

FOREIGN PATENT DOCUMENTS

DE 19634567 3/1998
(Continued)

OTHER PUBLICATIONS

International Search Report, PCT International Patent Application No. PCT/EP2008/058441, dated Oct. 17, 2008.

*Primary Examiner* — Behrang Badii
(74) *Attorney, Agent, or Firm* — Kenyon & Kenyon LLP

(57) ABSTRACT

A brake system for a vehicle having a sensor device for providing a first and second sensor signal, a first and a second brake control device, which are directly connected to the sensor device and to provide a corresponding control signal for the first and/or second sensor signal, and a first and a second signal line for transmitting the control signal, the first signal line directly connecting the first brake control device to a first and second wheel actuator device and the second signal line directly connecting the second brake control device to a third and fourth wheel actuator device, the four wheel actuator devices exerting a braking torque corresponding to the control signal on the associated wheel, and the first wheel actuator device being directly connected to the second brake control device and/or the sensor device. A method for operating a brake system for a vehicle is also provided.

10 Claims, 4 Drawing Sheets

FOREIGN PATENT DOCUMENTS

| | | |
|---|---|---|
| DE | 19832167 | 5/1999 |
| DE | 19826131 | 12/1999 |
| DE | 10357373 | 7/2005 |
| EP | 0832800 | 4/1998 |
| WO | WO 9513946 | 5/1995 |

* cited by examiner

BRAKE SYSTEM FOR A VEHICLE AND A METHOD FOR OPERATING A BRAKE SYSTEM FOR A VEHICLE

FIELD OF THE INVENTION

The present invention relates to a brake system for a vehicle. Furthermore, the present invention relates to a method for operating a brake system for a vehicle.

BACKGROUND INFORMATION

PCT Application No. WO95/13946 describes a brake system having a central module and several brake modules, the brake modules being assigned to different brake circuits. The brake modules are connected to the central module via a communication system. In order to be able to maintain the availability of the brake system even in the event of a failure of one of these components, the electric brake system has a hydraulic backup.

German Patent Application No. DE 196 34 567 describes a decentralized electromechanical brake system. The brake system includes a pedal unit, a processing unit and wheel pair units for regulating the wheel brakes. The brake system is supplied with energy via two separate vehicle electrical systems.

Furthermore, German Patent Application No. DE 103 57 373 B4 describes an electronic brake system, which has a brake pedal having two braking request means. One of the two braking request means is connected to a central control unit having an integrated brake circuit control system. The other of the two braking request means is coupled to an autonomous brake circuit control system. In the event of a failure of the central control unit or the autonomous brake circuit control system, the remaining brake circuit control system is able to control one brake circuit using its braking request means.

Conventional brake systems, however, are only poorly equipped for a successive failure of several of their components. Following a failure of several components of its brake system, a vehicle is normally no longer able to comply sufficiently with an input of the driver for reducing the speed of the vehicle. In such a situation, it is therefore no longer possible to bring the vehicle safely to a standstill.

It is therefore desirable to have a brake system for a vehicle which still allows for the affected vehicle to be braked safely when several of the brake system's components fail.

SUMMARY

According to example embodiments of the present invention, the braking action of a brake system having two brake circuits is improved following the failure of several components of the brake system if at least one wheel actuator device of a first brake circuit is coupled not only to a brake control device of the first brake circuit and via the respective brake control device to a sensor device, but is also connected directly to a brake control device of the second brake circuit and/or to the sensor device. If the sensor device is made up of several components, then the advantages of the present invention may be ensured if the respective wheel actuator device is connected directly to a subdevice of the sensor device for providing a sensor signal. Because of the possibility of direct communication between the respective wheel actuator device and the brake control device of the second brake circuit and/or the sensor device, the respective wheel actuator device is still able to receive a signal for braking a wheel associated with the wheel actuator device even after a failure of the brake control device of the first brake circuit. The respective wheel actuator device is thus able to bring the associated vehicle to a standstill for example following a failure of the first brake control device and the wheel actuator devices of the second brake circuit. This increases the safety for the occupants of the vehicle having the brake system of the present invention in such a situation.

Two components of the brake system of the present invention are directly connected to each other if they are either connected to each other via a line or are situated directly side-by-side. In this instance, the direct connection between the two components expresses the fact that this connection does not run through a third component such as a brake control device, a wheel actuator device or a sensor device. Instead, the direct connection is designed in such a way that it is not interrupted if another brake control device, another wheel actuator device or another sensor device fails.

The present invention is not limited to a brake system for a vehicle having four wheels. For example, it is also applicable to a vehicle having six or eight wheels, the number of wheel actuator devices associated with the brake circuits then being increased accordingly.

The advantages and features of the brake system of the present invention mentioned in the foregoing paragraphs accordingly apply also to the method for operating a brake system for a vehicle.

In a first specific embodiment of the brake system, the first wheel actuator device is connected directly to the second brake control device via a third signal line, and the third wheel actuator device is connected directly to the first brake control device via a fourth signal line. This ensures a data transmission between the first wheel actuator device and the second brake control device even after a failure of the first brake control device for example. For example, the second brake control device may thus control the first wheel actuator device instead of the failed first brake control device. In this context, "control" also means that the first brake circuit performs an automatic braking operation if it learns via the third signal line that the second brake circuit is no longer capable of braking.

Alternatively or additionally, the first wheel actuator device may be connected to the second signal line and the third wheel actuator device may be connected to the first signal line. This too allows for the first wheel actuator device to be controlled by the second brake control device after a failure of the first brake control device.

In addition, the second wheel actuator device may be connected to the second signal line and the fourth wheel actuator device may be connected to the first signal line. Following a failure of the first brake control device, in this case, the second wheel actuator device may also be controlled by the second brake control device.

Preferably, the first and the second brake control device are directly connected to each other via a fifth signal line, each of the two brake control devices in the active state being designed to detect whether the other brake control device is in the active state. In this case, the first and the second wheel actuator device in the active state are designed to receive the control signals of the second brake control device via the second signal line after detecting that the first brake control device is in the inactive state. The brake system is thus able to comply with an input of the driver for reducing the speed of the vehicle even after the failure of one of the two brake control devices.

For example, the brake control device calculates the wheel brake torques or the torque-forming voltages for all wheel brakes and outputs them to the wheel actuator devices. Each one of the wheel actuator devices is designed first to comply with the wheel brake torque or the torque-forming voltage of its own brake control device. If a wheel actuator device detects, however, that its own brake control device has failed, then it utilizes the wheel brake torque or the torque-forming voltage of the other brake control device.

In another specific embodiment of the brake system, the first wheel actuator device is connected directly to a first subdevice of the sensor device via a sixth signal line, and the third wheel actuator device is connected directly to a second subdevice of the sensor device via a seventh signal line. In this manner, a direct data transmission may also occur between the first subdevice of the sensor device and the first wheel actuator device and between the second subdevice of the sensor device and the third wheel actuator device.

In a further development, the first wheel actuator device in the active state is designed to detect whether the first brake control device is in the active state, and upon detecting that the first brake control device is in the inactive state to evaluate the first and/or second sensor signal transmitted via the sixth signal line from the first subdevice of the sensor device and to exert a braking torque corresponding to the first and/or second sensor signal on the associated wheel. The failure of the first brake control device may thus be bridged readily.

In a preferred specific embodiment of the brake system, at least one of the brake control devices or one of the wheel actuator devices in the active state is designed to check its operability and to switch to the inactive state when detecting a limited operability. The brake control device or wheel actuator device is thus designed to be fail-silent. This ensures that the brake control device or wheel actuator device, which is significantly limited in its operability, does not affect or actually hinder the other components in their correct operation. This increases the functional reliability of the respective brake system.

In another preferred specific embodiment, at least one of the wheel actuator devices in the active state is designed to detect whether a specified number of brake control devices and/or wheel actuator devices is in the inactive state, and automatically to exert a specified braking torque on the associated wheel upon detecting that the specified number of brake control devices and/or wheel actuator devices is in the inactive state. Thus, following a failure of several of its components in succession, the brake system is still able to brake the vehicle automatically. The speed of the vehicle is then automatically reduced when detecting a situation that is dangerous due to the failure of several components of the brake system. This ensures greater safety for the occupants of the vehicle in such a dangerous situation.

The present invention thus may ensure that, following a failure of several components of its brake system, a vehicle is braked either automatically or a braking operation of the vehicle initiated by the driver is performed.

BRIEF DESCRIPTION OF THE DRAWINGS

Additional possible uses and advantages of the present invention derive from the following description of exemplary embodiments, which are shown in the figures.

DETAILED DESCRIPTION OF EXAMPLE EMBODIMENTS

Figure 1:
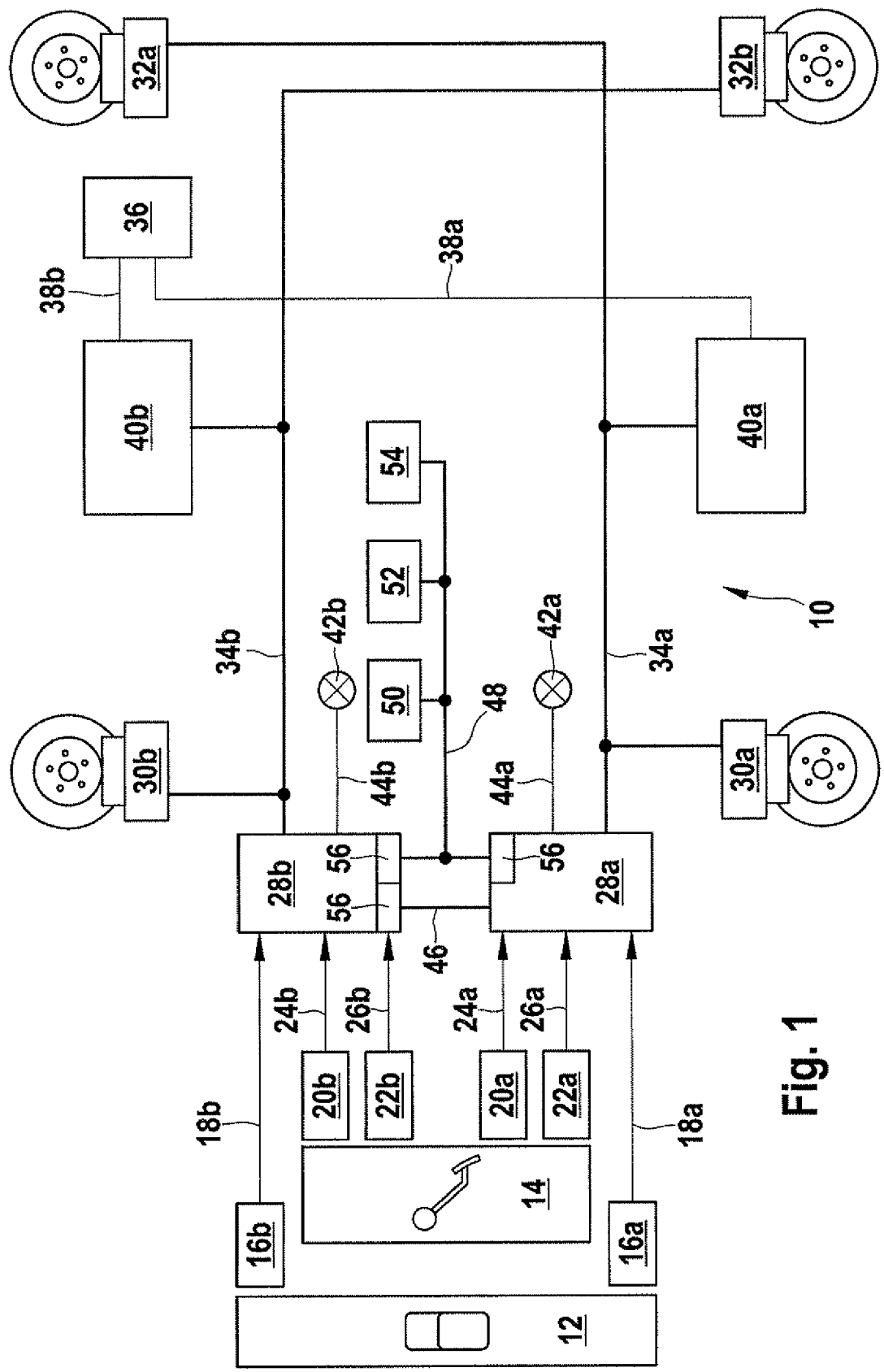
FIG. 1 shows a form of a brake system for comparison.

FIG. 1 shows a form of a brake system for a vehicle for the purpose of comparison. The represented brake system 10 has a parking brake activation device 12 and a brake pedal 14. Parking brake activation device 12 has two parking brake switches 16a and 16b associated with it for detecting an input of a driver and for outputting a corresponding sensor signal 18a and 18b. Brake pedal 14 is surrounded by two brake pedal sensors 20a and 20b and two brake light switches 22a and 22b. Switches 22a and 22b and sensors 20a and 20b detect either a pedal travel or a pedal angle of brake pedal 14 or a force exerted by the driver on brake pedal 14 and provide corresponding signals 24a, 24b, 26a and 26b on their outputs.

Brake system 10 is equipped with two brake control devices 28a and 28b, which are associated with two different brake circuits. First brake control device 28a controls a first brake circuit. For this purpose, first brake control device 28a receives signals 18a, 24a and 26a of switches 16a and 22a and of brake pedal sensor 20a, which it evaluates subsequently to ascertain a braking torque to be exerted on the wheels of the first brake circuit. First brake control device 28a then provides a control signal corresponding to the ascertained braking torque. Accordingly, second brake control device 28b receives and processes signals 18b, 24b and 26b of switches 16b and 22b and of sensor 20b for triggering a second brake circuit.

The left front wheel and the right rear wheel are associated with the first brake circuit. Each of the two wheels has a wheel actuator device 30a and 32a having a brake disk, wheel actuator device 30a being associated with the left front wheel and wheel actuator device 32a being associated with the right rear wheel. The two wheel actuator devices 30a and 32a of the first brake circuit are connected via a data bus 34a to each other and to first brake control device 28a. Via data bus 34a, wheel actuator devices 30a and 32a and first brake control device 28a are able to exchange data among one another. A control signal output by first brake control device 28a is transmitted to wheel actuator devices 30a and 32a via data bus 34a. Upon receiving the control signal, wheel actuator devices 30a and 32a exert a corresponding braking torque on their associated wheels.

The second brake circuit also has two wheel actuator devices 30b and 32b and a data bus 34b. In this instance, wheel actuator device 30b is associated with the right front wheel and wheel actuator device 32b is associated with the left rear wheel. A data and control signal transfer between wheel actuator devices 30b and 32b of the second brake circuit and second brake control device 28b is possible via data bus 34b.

A base vehicle electrical system 36 supplies power to brake system 10. Base vehicle electrical system 36 is connected to two vehicle electrical systems 40a and 40b respectively by one power line 38a and 38b. Vehicle electrical system 40a is associated with the first brake circuit and connected to data bus 34a. Accordingly, vehicle electrical system 40b is connected to the databus 34b of the second brake circuit.

For each of the two brake circuits, a warning lamp 42a and 42b is mounted in the cockpit of the vehicle having brake system 10. Warning lamp 42a is coupled to first brake control device 28a via control line 44a. Accordingly, second brake control device 28b controls warning lamp 42b via a control line 44b.

The two brake control devices 28a and 28b are connected to each other via two data buses 46 and 48. Data bus 48 connects the two brake control devices 28 and 28b additionally to a display device 50 mounted in the cockpit of the vehicle, to an ESP system 52 (electronic stability program) and to an engine control unit 54.

Brake control device 28a has an electronic protection element (EPE) 56 on the input of data bus 48. Corresponding electronic protection elements 56 are also attached to the inputs of data buses 46 and 48 of brake control device 28b. Electronic protection elements 56 are to protect brake control devices 28a and 28b against overvoltages. Such electronic protection elements 56 may also be situated on the inputs and outputs of the other components 30a, 30b, 32a, 32b, 40a and 40b of the two brake circuits. Electronic protection elements 56 make it possible to reduce the risk of a malfunction of a control device 28a, 28b, 30a, 30b, 32a and 32b.

Figure 2:
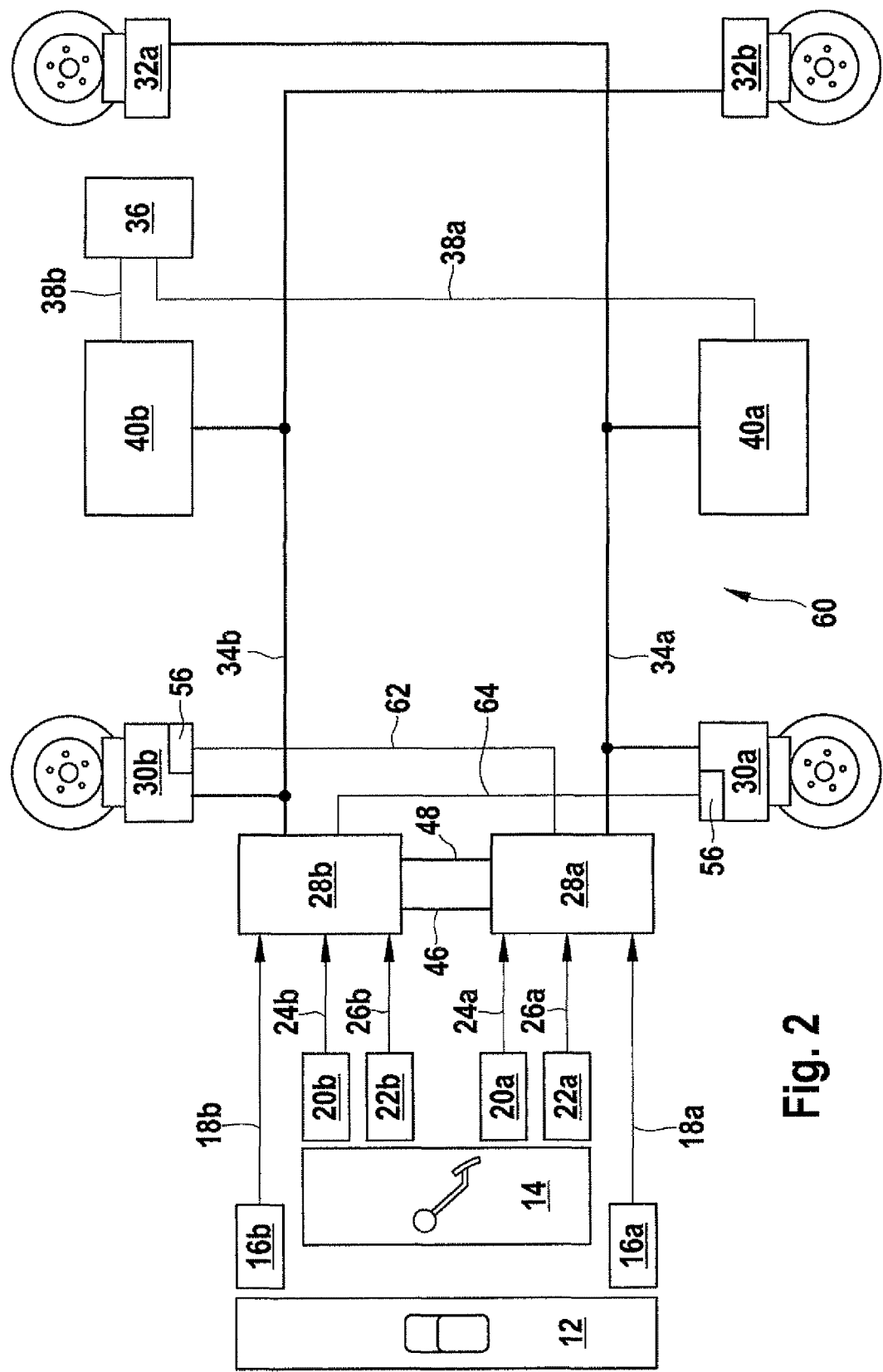
FIG. 2 shows a first specific embodiment of the brake system according to the present invention.

FIG. 2 shows a first specific embodiment of the brake system according to the present invention. The displayed brake system 60 includes all components of brake system 10 of FIG. 1. Warning lamps 42a and 42b, control lines 44a and 44b and external devices 50, 52 and 54 are not shown in FIG. 2, however.

In contrast to brake system 10, brake system 60 has two status lines 62 and 64. Status line 62 connects first brake control device 28a directly to wheel actuator device 30b of the second brake circuit. Status line 64 runs from the second brake control device 28b to wheel actuator device 30a of the first brake circuit. It should be noted at this point that neither of the status lines 62 or 64 has another component situated between components 28a and 30b or between components 28b and 30a. Thus it is possible, for example, to transmit data between first brake control device 28a and wheel actuator device 30b via status line 62 even if the other components 28b, 30a, 32a and 32b of brake system 60 have failed.

Information is exchanged via data between brake control devices 28a and 28b and wheel actuator devices 30a and 30b of the front wheels via status lines 62 and 64. In particular, first brake control device 28a informs wheel actuator device 30b of the second brake circuit about the status of the first brake circuit via status line 62. This status contains a message, for example, that brake control device 28a or the two wheel actuator devices 30a and 32a are no longer in an operational state. A respective status concerning the second brake circuit may be output by second brake control device 28b to wheel actuator device 30a of the first brake circuit via status line 64. In this manner, wheel actuator devices 30a and 30b are able to detect a situation in which the other brake circuit is no longer fully operational.

The following describes some possible advantages resulting from the two status lines 62 and 64:

One advantage of the two status lines 62 and 64 is that in brake system 60, following a failure of a brake control device 28a or 28b, it is still possible to control both brake circuits as a function of an input of the driver on parking brake activation device 12 and on brake pedal 14. If first brake control device 28a fails for example, then this event is detected by second brake control device 28b and the two wheel actuator devices 30a and 32a. Just before switching to an inactive state, first brake control device 28a for example transmits a corresponding message to second brake control device 28b and to the two wheel actuator devices 30a and 32a of the first brake circuit. Alternatively, the components of brake system 60, which are directly connected to one another, may also be designed to exchange messages among themselves about their active state on a regular basis.

Following the failure of first brake control device 28a, second brake control device 28b, which normally controls only the second brake circuit, additionally takes over control of the first brake circuit. In another development, second brake control device 28b is able to output control signals, for example a wheel braking torque or a control voltage proportional to a braking torque, to wheel actuator device 30a via status line 64. Wheel actuator device 30a relays a portion of the control signals to wheel actuator device 32a via data bus 34a.

By contrast, following a failure of a brake control device 28a or 28b of brake system 10, the still operational brake control device 28a or 28b is not capable of taking over control of the other brake circuit. In such a situation, the braking capacity of brake system 10 is thus considerably limited compared to the braking capacity of brake system 60.

Additionally, vehicle electrical systems 40a and 40b of brake system 60 are designed in such a way that they interrupt the supply of a wheel actuator device 30a, 30b, 32a or 32b only if a corresponding command signal is received by brake control device 28a or 28b of the respective brake circuit via data bus 34a or 34b. Thus, even after a failure of one of the two brake control devices 28a and 28b, the voltage supply of the associated wheel actuator devices 30a and 32a or 30b and 32b continues to be maintained.

Additionally, the responsiveness of brake system 60 to a failure of several of its components is improved in comparison to brake system 10.

Both brake control devices 28a and 28b may fail in succession while the vehicle having brake system 60 is traveling. In brake system 60, wheel actuator device 30a in such a situation detects the failure of its associated first brake control device 28a via data bus 34a and detects the failure of second brake control device 28b of the other brake circuit via status line 64. In a similar manner, wheel control device 30b also detects the failure of the two brake control devices 28a and 28b. Upon detecting this dangerous situation, in which the driver is no longer able to reduce the speed of the vehicle via an input, the two wheel actuator devices 30a and 30b associated with the front wheels then reduce the speed of the vehicle automatically. Additionally, wheel actuator devices 30a and 30b may be designed such that upon detecting the dangerous situation they relay respective messages to wheel actuator devices 32a and 32b of the rear wheels. Thereupon, wheel actuator devices 32a and 32b brake the rear wheels automatically. By applying a defined braking torque on each of the four wheels, which corresponds respectively to a deceleration of 0.1 g for example, the speed of the vehicle may be reduced quickly after a failure of the two brake control devices 28a and 28b. The vehicle is preferably brought to a standstill and subsequently the parking brake is engaged automatically.

Such a mutually adjusted automatic braking of the wheels of the vehicle by all four wheel actuator devices 30a, 30b, 32a and 32b is not possible in brake system 10. In brake system 10, after a failure of first brake control device 28a and a subsequent failure of second brake control device 28b, wheel actuator devices 30a and 32a of the first brake circuit detect only that first brake control device 28a is no longer in the active state. The failure of second brake control device 28b can no longer be communicated to wheel actuator devices 30a and 32a of the first brake circuit because it is connected to components 28b, 30b and 32b of the second brake circuit only via the already failed first brake control device 28a. Following a failure of the two brake control devices 28a and 28b, brake system 10 is thus no longer as operational as brake system 60.

While the vehicle having brake system 60 is traveling, the situation may also occur that both brake control devices 28a and 28b and one of the two wheel actuator devices 30a or 30b on a front wheel fail. Since both wheel actuator devices 30a or 30b of the front wheels are informed about the failure of the two brake control devices 28a and 28b, however, in such a situation, the remaining wheel actuator device 30a or 30b is still able to effect an automatic braking of the vehicle.

For example, if the two brake control devices 28a and 28b and the wheel actuator device 30b of the second brake circuit fail, then wheel actuator device 30a detects via data bus 34a that first brake control device 28a has failed. In addition, wheel actuator device 30a is able to detect via status line 64 that the brake control device 28b of the other brake circuit has failed as well. If one of the two brake control devices 28a and 28b is still operational at the time at which wheel actuator device 30b fails, then a corresponding message may be output via data bus 34a or via status line 64 to wheel actuator device 30a. Since wheel actuator device 30a thus detects that the failed wheel actuator device 30b is no longer able to exert a braking torque on its associated front wheel, wheel actuator device 30a performs an automatic braking operation at an increased braking torque. In addition, wheel actuator device 30a may output the status information about the state of the two brake control devices 28a and 28b and wheel actuator device 30b to wheel actuator device 32a via data bus 34a. In this case, the two remaining operational wheel actuator devices 30a and 32a of the first diagonal brake circuit perform an automatic braking operation. This is performed until the vehicle has been decelerated to a maximum speed of a few kilometers per hour or has been brought to a standstill.

Accordingly, even after a failure of the two brake control devices 28a and 28b and the two wheel actuator devices 30b and 32b of the other brake circuit, the two wheel actuator devices 30a and 32a are still able to perform an automatic braking operation. This increases the safety of the driver while driving.

Since in brake system 10 of FIG. 1, a data transmission between the two brake circuits is possible only via the two brake control devices 28a and 28b, following a failure of one of the two brake control devices 28a and 28b, the wheel actuator devices 30a and 32a or 30b and 32b of a brake circuit are only able to react insufficiently to a later failure of a wheel actuator device 30a and 32a or 30b and 32b of the other brake circuit. In comparison to brake system 10, brake system 60 is therefore better developed for such a situation.

As seen in FIG. 2, the inputs of status lines 62 and 64 on wheel actuator devices 30a and 30b are protected by electrical protection elements 56. Preferably, electrical protection elements 56 are installed within wheel actuator devices 30a and 30b.

Figure 3:
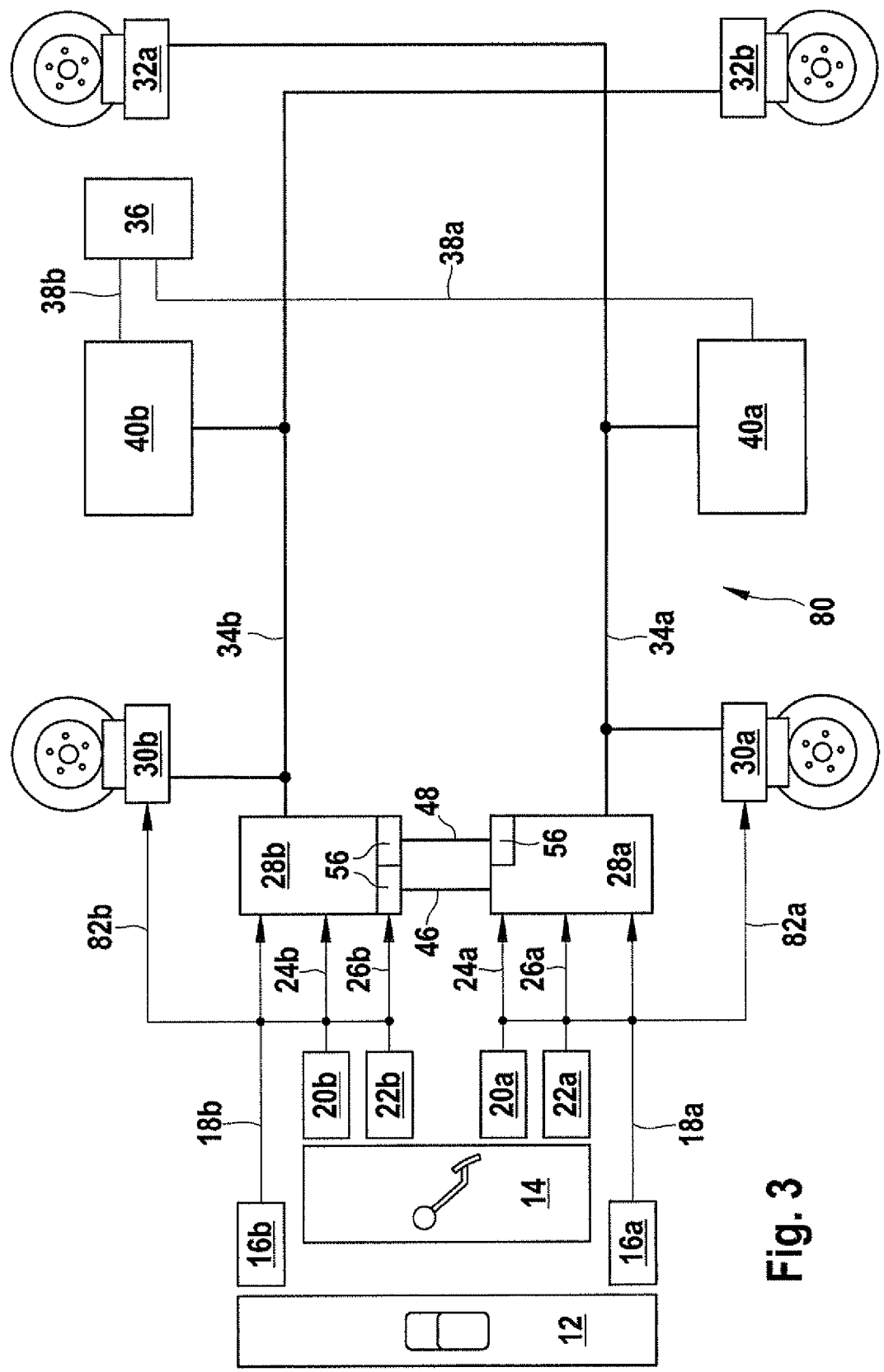
FIG. 3 shows a second specific embodiment of the brake system according to the present invention.

FIG. 3 shows a second specific embodiment of the brake system according to the present invention. The components of brake system 10 shown in FIG. 1 also exist in brake system 80 of FIG. 3. Components 42a, 42b, 44a, 44b, 50, 52 and 54, however, are not sketched in FIG. 3.

In contrast to brake system 10, brake system 80 has two lines 82a and 82b, via which wheel actuator devices 30a and 30b of the front wheels are directly connected to the brake pedal sensor system of their brake circuit. Line 82a transmits sensor signals 18a, 24a and 26a from switches 16a and 22a and sensor 20a to wheel actuator device 30a. Accordingly, signals 18b, 24b and 26b are not only read in by brake control device 28b, but also in wheel actuator device 30b. Wheel actuator devices 30a and 30b are designed to evaluate the sensor signals 18a, 18b, 24a, 24b, 26a and 26b assigned to them at least partially with respect to a braking torque to be exerted on the associated wheel.

If a wheel actuator device 30a or 30b detects that its associated brake control device 28a or 28b has failed, it no longer performs the braking operation on its wheel as a function of the control signal of its own brake control device 28a or 28b. Instead, wheel actuator device 30a or 30b begins with the evaluation of the sensor signals 18a, 18b, 24a, 24b, 26a and 26b transmitted directly to it. On the basis of these sensor signals 18a, 18b, 24a, 24b, 26a and 26b, wheel actuator device 30a or 30b ascertains what braking torque it should exert on its associated wheel. At the same time, wheel actuator device 30a or 30b may determine a setpoint braking torque for the other wheel actuator device 32a or 32b of its own brake circuit. Subsequently, wheel actuator device 30a or 30b outputs the ascertained setpoint braking torque to the other wheel actuator device 32a or 32b of its own brake circuit. Alternatively, wheel actuator device 30a or 30b may also transmit the respective sensor signals 18a, 18b, 24a, 24b, 26a and 26b directly to the other wheel actuator device 32a or 32b of its own brake circuit for evaluation.

A vehicle electrical system 40a or 40b of brake system 80 interrupts the supply of a wheel actuator device 30a, 30b, 32a and/or 32b only as a result of a command or a message from the associated brake control device 28a or 28b via data bus 34a or 34b. In case of errors in one of the two brake control devices 28a or 28b, the power supply of wheel actuator devices 30a, 30b, 32a and 32b, of switches 16a, 16b, 22a and 22b and of sensors 20a and 20b by the respective vehicle electrical system 40a or 40b is thus maintained.

It is important to note that line 82a is not connected to brake control device 28a. Thus, a transmission of sensor signals 18a, 24a and/or 26a from switches/sensors 16a, 20a and/or 22a to wheel actuator device 30a is not affected by a failure of brake control device 28a.

In the example from FIG. 3, line 82a is connected to all three lines of signals 18a, 24a and 26a. Alternatively, line 82a may also run from switches/sensors 16a, 20a and/or 22a to wheel actuator device 30a. It is likewise possible to run individual lines from switches/sensors 16a, 20a and/or 22a that lead directly to wheel actuator device 30a.

The exemplary embodiments mentioned in the paragraph above may of course also be implemented for line 82b, which supplies wheel actuator device 30b with signals 18b, 24b and/or 26b of switches/sensors 16b, 20b and/or 22b.

In brake system 80, via data buses 34a and 34b, message counters, data checks and timeout monitoring are used for securing data between a brake control device 28a or 28b and its associated wheel actuator devices 30a and 32a or 30b and 32b. This represents additional protection for the data transmission between brake control devices 28a and 28b and the associated wheel actuator devices 30a and 32a or 30b and 32b.

The differences between brake system 10 from FIG. 1 and brake system 80 from FIG. 3 come to bear if at least one of brake control devices 28a or 28b fails. If one of brake control devices 28a or 28b fails in brake system 10, then no signal can be transmitted anymore via the failed brake control device 28a or 28b to the associated wheel actuator devices 30a or 30b. Failed brake control device 28a or 28b also no longer outputs any control signal to wheel actuator devices 30a and 32a or 30b and 32b of its brake circuit.

If on the other hand brake control device 28a fails in brake system 80 for example, then each of the sensor signals 18a, 24a and 26a of switches 16a and 22a and of sensor 20a may be transmitted via line 82a to wheel actuator device 30a. In addition, wheel actuator device 32a may also receive these sensor signals 18a, 24a and 26a via data bus 34. Both wheel actuator devices 30a and 32a may have a logic, which, in the event of a failure of their own brake control device 28a, switches to a brake operation as a function of received signals 18a, 24a and 26a. The logic preferably contains elements for storage. It is designed to detect the failure of its own brake control device 28a. Such a logic may be implemented in hardware or in software. Wheel actuator devices 30a and 32a then ascertain from sensor signals 18a, 24a and 26a with the aid of a defined characteristic curve the setpoint braking torque corresponding to sensor signals 18a, 24a and 26a. Preferably, wheel actuator devices 30a and 32a take into account an axle load distribution to be maintained by a preferred difference between the braking torque of a front wheel and the braking torque of a rear wheel.

A failure of a brake control device 28a or 28b is communicated to the other brake control device 28a or 28b via data buses 46 and/or 48. Alternatively, brake control devices 28a and 28b may also be designed to detect a failure of the neighboring brake control devices 28a or 28b due to an absence of messages from the latter. The still operational brake control device 28a or 28b may subsequently control the wheel actuator devices 30a and 32a or 30b and 32b, which it is still able to control, in such a way that they adapt to the wheel actuator devices 30a and 32a or 30b and 32b of the other brake circuit having the failed brake control device 28a or 28b. A symmetrical braking of the wheels may thus be achieved.

For this purpose, each of the brake control devices 28a and 28b of brake system 80 is also provided with a logic, which, in the event of a failure of the other brake control device 28a or 28b, switches to a corresponding braking operation as a function of the read-in brake pedal sensor system. This logic also contains elements for storing and decoding the state resulting when the other brake control devices 28a or 28b fail. It is possible to implement this logic in hardware or software.

If a situation occurs in brake system 80 such that both brake control devices 28a and 28b fail, then in this case it is also still possible to perform a braking operation controlled by sensor signals 18a, 18b, 24a, 24b, 26a and 26b. This may be ensured because, after a failure of the two brake control devices 28a and 28b, the respective sensor signals 18a, 18b, 24a, 24b, 26a and 26b are transmitted to wheel actuator devices 30a and 30b. Via data bus 34a, wheel actuator device 30a detects that its associated brake control device 28a has failed. Accordingly, wheel actuator device 30b also detects that brake control device 28b has failed since no more signals are received from it via data bus 34b. In this case, the two wheel actuator devices 30a and 30b perform a braking operation controlled by sensor signals 18a, 18b, 24b, 26a and 26b. Additionally, sensor signals 18a, 18b, 24a, 24b, 26a and 26b may be transmitted via data buses 34a and 34b to wheel actuator devices 32a and 32b. Wheel actuator devices 32a and 32b, which are situated on the rear wheels, are subsequently able to evaluate the transmitted sensor signals 18a, 18b, 24a, 24b, 26a and 26b and brake their wheels accordingly. The different braking torque of the front wheels and the rear wheels is set in accordance with the desired maximum vehicle deceleration and the required or desired braking force distribution onto the axles of the vehicle.

The mechanism described in the above paragraphs for the failure of the two brake control devices 28a and 28b also works if one of wheel actuator devices 30a, 30b, 32a or 32b fails in addition to the two brake control devices 28a and 28b. To be sure, in this case there are fewer brakable wheels available for the controlled braking operation.

In the following, the example will be considered in which brake control devices 28a and 28b and wheel actuator device 30a fail. The front wheel on the left operated by defective wheel actuator device 30a cannot be braked any longer. In this case, wheel actuator devices 30b and 32b are still able to perform a controlled braking operation and are able to compensate for the failure of wheel actuator device 30a by braking their wheels more forcefully if at most half of the maximum possible braking action is requested.

Figure 4:
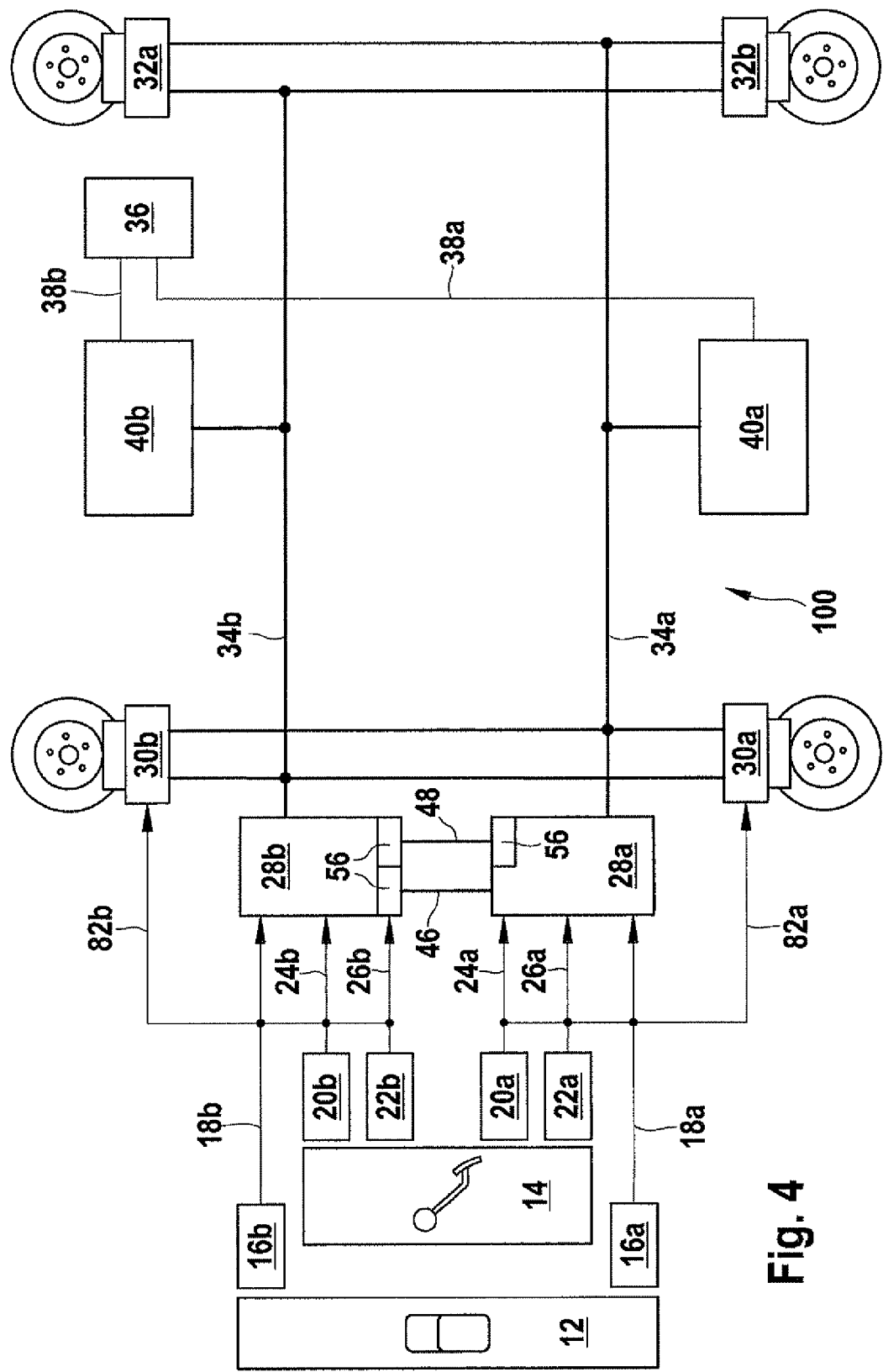
FIG. 4 shows a third specific embodiment of the brake system according to the present invention.

FIG. 4 shows a fourth specific embodiment of the brake system. The shown brake system 100 includes all components of brake system 80 of FIG. 3. Drawing in warning lamps 42a and 42b, their lines 44a and 44b and external devices 50, 52 and 54 was omitted, however.

In contrast to brake system 80 of FIG. 3, brake system 100 of FIG. 4 has extended data buses 34a and 34b. Brake control device 28a is connected to all wheel actuator devices 30a, 30b, 32a and 32b via data bus 34a. Accordingly, brake control device 28b is also connected to wheel actuator devices 30a and 32a of the first brake circuit and to wheel actuator devices 30b and 32b of the second brake circuit via data bus 34b.

Via line 82a, wheel actuator device 30a is able to obtain signals 18a, 24a and 26a of switches 16a and 22a and of sensor 20a. Likewise, line 82b relays signals 18b, 24b and 26b of switches 16b and 22b and of sensor 20b directly to wheel actuator device 30b.

The logic of wheel actuator devices 30a and 30b is developed in such a way that, when their own brake control device 28a or 28b is in the active state, they only takes into account the control signals transmitted by their own brake control device 28a or 28b for braking the wheels. If their own brake control device 28a or 28b has failed, while the other brake control device 28a or 28b is still in the active state and transmits control signals, then the control signals of the other brake control device 28a or 28b are used for braking the wheels.

Each of the two brake control devices 28a and 28b reads in the transmitted sensor signals 18a, 18b, 24a, 24b, 26a and 26b, and outputs the control signals for the wheel braking torques accordingly to wheel actuator devices 30a, 30b, 32a and 32b.

In addition, the control signals for the wheel braking torques may be controlled with the aid of the actual braking torques fed back from wheel actuator devices 30a, 30b, 32a and/or 32b.

Following a failure of one of the two brake control devices 28a or 28b, the four wheel brakes of the vehicle having brake system 100 use the wheel braking torques from the other brake control device 28a or 28b. The two brake control devices 28a and 28b accordingly require more powerful computers, which also accordingly require more resources, only if they calculate, not the wheel braking torques, but rather another torque-determining variable, for example the torque-determining voltage.

If the two brake control devices 28a and 28b have failed, then wheel actuator devices 30a and 30b evaluate sensor signals 16a, 16b, 24a, 24b, 26a and 26b themselves. In a further development, the wheel actuator devices 30a and 30b associated with the front wheels transmit the read-in sensor signals 16a, 16b, 24a, 24b, 26a and 26b to the wheel actuator devices 32a and 32b associated with the rear wheels. Following a failure of the two brake control devices 28a and 28b, all wheel actuator devices 30a, 30b, 32a and 32b are designed to process sensor signals 16a, 16b, 24a, 24b, 26a and 26b and accordingly to perform a controlled braking operation using a variable setpoint value.

Brake system 10 of FIG. 1 having two brake circuits has the disadvantage that, in spite of using four wheel actuator devices 30a, 30b, 32a and 32b, in the event of a failure of one of the two brake control devices 28a or 28b, the remaining braking action of brake system 10 is markedly reduced. With the failure of one of the two brake control devices 28a and 28b, one of the two brake circuits becomes immediately ineffective, even though all wheel actuator devices 30a, 30b, 32a and 32b are still operational. In the event of a failure of both brake control devices 28a and 28b of brake system 10, no braking action remains. Even when the two wheel actuator devices 30a and 32a or 30b and 32b of one brake circuit fail together with the brake control device 28a or 28b of the other brake circuit, no braking action remains.

By contrast, brake system 100 has the advantage that even after a failure of the two brake control devices 28a and 28b and of the three wheel actuator devices 30b, 32a and 32b, the remaining wheel actuator device 30a is still able to comply with sensor signals 18a, 24a and 26a. Brake system 100 is thus developed such that a vehicle equipped with it may still be stopped in this dangerous situation.

If the two brake control devices 28a and 28b and the three wheel actuator devices 30a, 30b and 32b have failed, then the still operational wheel actuator device 32a detects that the remaining components of brake system 100 are no longer in an operational state. In this case, the remaining wheel actuator device 32a is designed to initiate an automatic braking of the vehicle upon detecting this situation. Thus, even in such a situation, a minimum of safety is still ensured for the occupants of the vehicle having brake system 100.

What is claimed is:

1. A brake system for a vehicle, comprising:
   a sensor device adapted to detect an input of a driver of the vehicle for reducing a current speed of the vehicle and to provide a corresponding first and second sensor signal;
   a first and a second brake control device directly connected to the sensor device, each of the first and second brake control devices adapted to provide, in an active state and upon receiving at least one of the first and second sensor signal, a corresponding control signal; and
   a first and a second signal line to transmit a control signal, the first signal line directly connecting the first brake control device to a first and a second wheel actuator device and the second signal line directly connecting the second brake control device to a third and a fourth wheel actuator device, each of the first, second, third and fourth wheel actuator devices being respectively associated with one wheel of the vehicle and in an active state being adapted to exert a braking torque on the associated wheel upon receiving the control signal, and the first wheel actuator device being directly connected to at least one of the second brake control device and the sensor device;
   wherein the first wheel actuator device is directly connected to a first subdevice of the sensor device via a sixth signal line and the third wheel actuator device is directly connected to a second subdevice of the sensor device via a seventh signal line.

2. The brake system as recited in claim 1, wherein the first wheel actuator device is directly connected to the second brake control device via a third signal line and the third wheel actuator device is directly connected to the first brake control device via a fourth signal line.

3. The brake system as recited in claim 1, wherein the first wheel actuator device is connected to the second signal line and the third wheel actuator device is connected to the first signal line.

4. The brake system as recited in claim 3, wherein the second wheel actuator device is connected to the second signal line and the fourth wheel actuator device is connected to the first signal line.

5. The brake system as recited in claim 2, wherein the first and the second brake control device are directly connected to each other via a fifth signal line, and each of the first and second brake control devices in the active state adapted to detect whether the other brake control device is in the active state.

6. The brake system as recited in claim 5, wherein the first and the second wheel actuator device in the active state being designed to receive control signals of the second brake control device via the second signal line upon detecting that the first brake control device is in the inactive state.

7. The brake system as recited in claim 1, wherein the first wheel actuator device in an active state adapted to detect whether the first brake control device is in an inactive state, and, upon detecting that the first brake control device is in an active state, to evaluate at least one of the first sensor signal and second sensor signal, transmitted via the sixth signal line from the first subdevice, and to exert a braking torque on the associated wheel corresponding to at least one of the first sensor signal and second sensor signal.

8. The brake system as recited in claim 1, wherein at least one of the brake control devices or one of the wheel actuator devices in an active state adapted to check its operability and to switch into an inactive state when detecting a limited operability.

9. The brake system as recited in claim 1, wherein at least one of the wheel actuator devices in an active state is adapted to detect whether a specified number of at least one of brake control devices and wheel actuator devices is in an inactive state, and automatically to exert a specified braking torque on the associated wheel upon detecting that the specified number of the at least one of the brake control devices and wheel actuator devices is in an inactive state.

10. A method for operating a brake system for a vehicle, the brake system including a sensor device which is adapted to detect an input of a driver of the vehicle for reducing a current speed of the vehicle and to provide a corresponding first and second sensor signal, a first and a second brake control device which is directly connected to the sensor device, each of the two brake control devices being adapted to provide, in the active state, a corresponding control signal upon receiving at least one of the first and second sensor signal, and a first and a second signal line to relay a control signal, the first signal line directly connecting the first brake control device to a first and a second wheel actuator device and the second signal line directly connecting the second brake control device to a third and a fourth wheel actuator device, each of the first, second, third and fourth wheel actuator devices being respectively associated with one wheel of the vehicle and in an active state adapted to exert a braking torque on the associated wheel upon receiving a control signal, the method comprising:
   at least one of: i) directly transmitting the control signal from the second brake control device at least to the first of the wheel actuator devices, and ii) directly transmitting at least one of the first and second sensor signal from the sensor device at least to the first wheel actuator device;
   wherein the first wheel actuator device is directly connected to a first subdevice of the sensor device via a sixth signal line and the third wheel actuator device is directly connected to a second subdevice of the sensor device via a seventh signal line.

* * * * *